US008272949B2

(12) United States Patent
Dickerson

(10) Patent No.: US 8,272,949 B2
(45) Date of Patent: Sep. 25, 2012

(54) SYSTEM AND METHOD FOR AUTOMATIC PROGRESSIVE LINK DISPERSAL

(75) Inventor: Scott Dickerson, Henderson, NV (US)

(73) Assignee: Aristocrat Technologies Australia Pty, Ltd. (AU)

( * ) Notice: Subject to any disclaimer, the term of this patent is extended or adjusted under 35 U.S.C. 154(b) by 5 days.

(21) Appl. No.: 11/059,479

(22) Filed: Feb. 16, 2005

(65) Prior Publication Data

US 2006/0183537 A1 Aug. 17, 2006

(51) Int. Cl.
*A63F 13/00* (2006.01)

(52) U.S. Cl. ................ 463/27; 463/16; 463/20; 463/26; 463/28

(58) Field of Classification Search .................... 463/25, 463/16, 18, 26–28, 20, 40–42; 273/143 R
See application file for complete search history.

(56) References Cited

U.S. PATENT DOCUMENTS 5,275,400 A * 1/1994 Weingardt et al. .............. 463/12
RE35,864 E * 7/1998 Weingardt ...................... 463/28
6,554,283 B2 4/2003 Vancura et al.
6,634,946 B1 * 10/2003 Bridgeman et al. ............ 463/28
6,776,715 B2 8/2004 Price
2005/0037837 A1 * 2/2005 Rowe ............................. 463/25

OTHER PUBLICATIONS

International Search Report for PCT application, No. PCT/US06/05211; 2 pages, Aug. 9, 2007.

* cited by examiner

*Primary Examiner* — Ronald Laneau
*Assistant Examiner* — Ross Williams
(74) *Attorney, Agent, or Firm* — McAndrews, Held & Malloy, Ltd.

(57) ABSTRACT

Certain embodiments provide a system and method for automatic progressive link management and dispersal. Certain embodiments of a progressive gaming system include a first progressive link, wherein the first progressive link includes a first progressive amount. The system also includes a second progressive link, wherein the second progressive link includes a second progressive amount. The system further includes a progressive manager capable of automatically dispersing to the second progressive amount a portion of the first progressive amount greater than a base amount upon removal of the first progressive link. In an embodiment, the progressive manager calculates the portion of the first progressive amount that is greater than the base amount. In an embodiment, the first and second progressive links are active in multiple gaming environments. The progressive manager may schedule automatic dispersal of the portion of the first progressive amount to a selected progressive amount at a selected time.

7 Claims, 7 Drawing Sheets

SYSTEM AND METHOD FOR AUTOMATIC PROGRESSIVE LINK DISPERSAL

BACKGROUND OF THE INVENTION

This invention relates to progressive gaming systems, and more particularly relates to dispersal of progressive link amounts upon removal of a progressive link.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A large gaming casino typically employs thousands of gaming machines that can be operated simultaneously. These gaming machines can be used to simultaneously play multiple games using multiple progressive jackpots as rewards. For example, a first group of users simultaneously may be playing a first group of gaming machines employing a first progressive link at a single gaming facility or multiple gaming facilities, while a second group of users simultaneously may be playing a second group of gaming machines employing a second progressive link at the one or more facilities. Typically, the gaming machines include coin meters that generate data used to calculate the progressive amounts. The data is transmitted from each gaming machine and each gaming location to a progressive server at a remote or local location, which may receive a large amount of data, including jackpot data, during a short time period. In addition, each progressive typically uses a separate link with one or more levels. This results in additional expense to install and maintain the multiple links and communication lines.

A gaming system providing entertaining and enticing features for players would be highly desirable to attract both new and returning players to a gaming establishment. Additionally, a progressive or other gaming system that allows customization and dynamic modification by an operator would be highly desirable to provide new features to customers. Current gaming machines are difficult to reconfigure and offer the same game to multiple users at multiple gaming establishments. Certain games may become old or unattractive to players and need updating or replacing. When one or more progressive links or levels are shut down, money collected in one or more levels of a progressive link must be distributed. Currently, an excess amount collected above a base amount is manually counted. A casino employee manually records (i.e., writes down) the excess number. Then, the employee determines which other progressive link(s) should receive the excess amount(s). The employee manually accesses a workstation for the particular link(s) and manually updates the progressive amounts accordingly. Such manual, employee-intensive tasks are time-consuming and inefficient. Thus, an improved system and method for removing progressive links and updating or dispersing progressive amounts would be highly desirable.

Additionally, manual reconfiguration of a gaming machine or progressive link by a human operator raises concerns regarding security of data and integrity of a game on the gaming machine. That is, gaming establishments and legal authorities place high priority on the integrity of a game, such as a slot or poker game. Thus, there is a need for a configurable system that does not disturb sensitive game or prize data and reduces possibility for human error in gaming configuration.

Thus, there is a need for a configuration and control system and method for a gaming environment that allows one or more progressive links to be modified and one or more progressive amounts dispersed.

BRIEF SUMMARY OF THE INVENTION

Certain embodiments provide a system and method for automatic progressive link management and dispersal. Certain embodiments of a progressive gaming system include a first progressive link, wherein the first progressive link includes a first progressive amount. The system also includes a second progressive link, wherein the second progressive link includes a second progressive amount. The system further includes a progressive manager capable of automatically dispersing to the second progressive amount a portion of the first progressive amount greater than a base amount upon removal of the first progressive link.

In an embodiment, the progressive manager calculates the portion of the first progressive amount that is greater than the base amount. In an embodiment, the first and second progressive links are active in multiple gaming environments. The progressive manager may schedule automatic dispersal of the portion of the first progressive amount to a selected progressive amount at a selected time. The progressive manager may disperse the first progressive amount and an additional amount to the second progressive amount, for example.

The system may also include at least one meter to track the first and second progressive amounts. The system may also include a user interface capable of allowing a user to view and adjust progressive links and dispersals.

Certain embodiments of a method for automatic dispersal of removed progressive links include scheduling a first progressive link for removal, calculating a dispersal amount for the first progressive link, identifying at least one target progressive link for dispersal, and dispersing electronically the dispersal amount to the at least one target progressive link. The dispersal amount may be electronically dispersed to at least one level of the at least one target progressive link. In an embodiment, the electronic dispersal of the dispersal amount includes automatically dispersing the dispersal amount to the at least one target progressive link. Furthermore, an additional or hidden amount may be dispersed to the at least one target progressive link.

The method may further include modifying at least one parameter of at least one of the first progressive link and the target progressive link. Additionally, the method may include generating an audit trail based at least on dispersing electronically the dispersal amount to at least one target progressive link. The method may also include scheduling the dispersal of the dispersal amount to at least one target progressive link.

Certain embodiments include a computer-readable storage medium including a set of instructions for a computer. The set of instructions include a progressive link management routine for managing progressive links in one or more gaming environments, wherein the progressive link management routine facilitates removal of one or more progressive links. The set of instructions also includes an accounting routine for tracking progressive values for the progressive links and a dispersal routine for dispersing one or more progressive amounts from one or more inactive progressive links to one or more active progressive links. The set of instructions may also include a scheduling routine for scheduling dispersal of one or more progressive amounts.

In an embodiment, the accounting routine determines an excess amount above a base amount present in a progressive value for an inactive progressive link. In an embodiment, the progressive link management routine manages one or more levels within one or more progressive links. The accounting routine may also generate a report based on progressive link activity, for example. Additionally, the progressive link management routine may allow at least one criterion to be set relating to the dispersal routine.

DETAILED DESCRIPTION OF THE INVENTION

Figure 1:
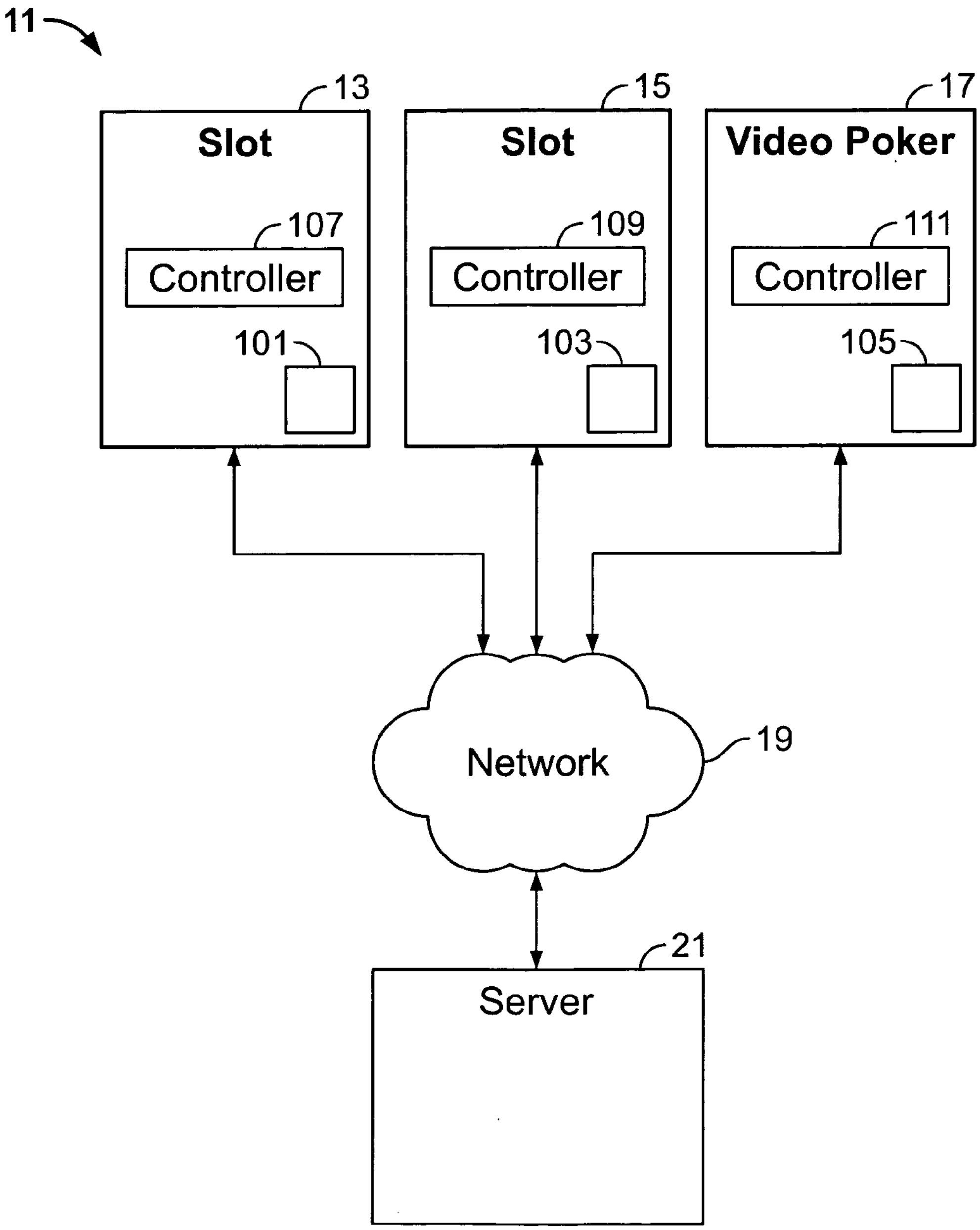
FIG. 1 illustrates a casino network system with an improved communications interface used in accordance with an embodiment of the present invention.

Certain embodiments provide a method and system for progressive link management for one or more progressive links in a gaming environment, such as a casino, or network of gaming environment, such as a multi-site progressive involving a plurality of casinos. Referring to FIG. 1, an example of a casino network system 11 includes a plurality of gaming machines 13, 15, and 17 interconnected across a network 19 to a server 21. Gaming machines 13, 15, 17 may utilize applications or web services of server 21 to provide visual displays, such as slot or video poker displays. Gaming machines 13, 15, 17 may communicate with server 21 via network 19 using standard or proprietary, custom protocols, for example.

Each gaming machine 13, 15, 17 includes a smart communications interface (SCI) 101, 103, 105, respectively, which communicates with a respective gaming controller 107, 109, 111 using a particular protocol, for example, a Slot Accounting System (SAS) protocol. SCIs 101, 103, 105 communicate directly onto network 19 and/or communicate with network 19 via a data port unit (not shown).

Server 21 may be designed to run on a network platform and to service requests from gaming machines 13, 15, 17. Server 21 may be accessed from network 19, through standard networking protocols, such as transmission control protocol/internet protocol (TCP/IP), user datagram protocol (UDP), telnet, file transfer protocol (FTP), hypertext transport protocol (HTTP), internet control message protocol (ICMP), internet group management protocol (IGMP), etc. Documents, such as hypertext markup language (HTML), extensible markup language (XML), rich text format (RTF), etc., may be transmitted to and/or from server 21.

Server 21 has a multi-tiered architecture that includes a number of software layers including one or more applications, an application program interface (API) and an operating system. The applications provide a number of different services, including accounting services, player tracking services, progressive game services, browsing services, cashless play services, etc. The applications may be written in various languages including, for example, C#, Java, or SQL. The operating system for example, is a Windows® brand operating system which provides conventional functions.

Server 21 may push out, i.e., publish, information to various subscribers including gaming machines 13, 15, 17. For example, gaming machine 13 may subscribe to a progressive game or a "bonus time" alert. Server 21 notifies gaming machines that have subscribed that a bonus period has started and that jackpots are to be paid out at twice the pay table, for example. The bonusing service for particular gaming machines may be subscribed to, for example, using casino workstation 31 (not shown). Workstation 31 may communicate a request to server 21 to publish to specifically identified gaming machines that a bonus period is to begin. The request may also provide additional information as to the amount of the bonus, the type of bonus, a bonus multiplier, etc. The request may also ask server 21 to publish the end of the bonus period as well. The server 21 may provide such a bonus service in real time with the bonus event, or merely provide a scheduled command for future bonus events.

In another example, applications server 21 may publish to certain gaming machines that a tournament has ended. Using the method taught in U.S. Pat. No. 6,039,648, assigned to Casino Data Systems and incorporated herein by reference, server 21 may communicate the end of a tournament play, so that appropriate pay tables and displays at the gaming machines may be activated.

Server 21 may include a plurality of functions that may be called by other systems or devices connected to network 19. Such functions may include conventional method or function calls as well as remote calls, e.g., proxy and simple object access protocol (SOAP)/XML invocations. For example, server 21 may be called by gaming machines 13, 15, 17.

Server 21 provides data to or retrieves data from a database 25. For example, data is stored as to gaming activity, player account information, advertisements, ticketing, etc. For example, meter data is received by server 21. Server 21 stores the meter data in a database. Meter data may include player win/loss data, bonus jackpot data, progressive link/level data, gaming machine coin-in/payout data, etc. Also, data may be retrieved including player information, accounting data, application programs, etc.

For purposes of simplicity, only three gaming machines 13, 15, 17 are shown in FIG. 1. In actuality, a casino may contain hundreds, or even thousands, of gaming machines. In addition to gaming machines, a casino may include various non-gaming machine locations, such as craps and blackjack. Such locations include an SCI, similar to SCI 101, 103, or 105, which is connected to network 19. In an embodiment, gaming and non-gaming machine locations may be spread throughout several casinos located remotely from one another.

Server 21 provides services for each gaming machine. Server 21 may provide different services for different gaming machines. For example, gaming machines may be included in a progressive game and thus use a progressive service from server 21. Typically, all gaming machines use an accounting service from server 21 which accounts for coins and bills inserted into the gaming machine as well as an accounting of coins cashed out of the gaming machine to a player.

Other services, such as player tracking and cashless play services, may be provided by server 21. A typical player account may be stored in a database for tracking of the player. The player accounts are updated by server 21 as player information is sent to server 21 from gaming machines 13, 15, 17, workstation 31 or an external system 33 (not shown). For example, a restaurant acting as an external system 33 may request server 21 to add loyalty points to the player's account in the database based on the amount of money spent by the player at the restaurant. As another example, a player at gaming machine 13 may request server 21 to convert 1000 points of the points balance in the player's account to credits on the credit meter of gaming machine 13. As another example, server 21 may provide game programs or other parameters to a particular gaming machine.

More specifically, gaming machine 13 sends a service request to server 21. SCI 101 packages the request in a proper protocol and places the request onto network 19. Various switches and/or routers may be included in network 19 in order to route the service request to server 21. The request may include (1) data, (2) a message request, and (3) the network address of server 21. The message request seeks a particular service to be performed by execution of an application by server 21. The application is run in connection with the data, if any, in the request. The application may then generate a message back onto network 19 addressed to machine 13. SCI 101 receives the message and responds accordingly, as for example, adjusting the credit meter, generating a display of information to the player, etc.

Alternatively, SCI 101, 103, or 105 may be connected to a hub for wireless communication of the service request to the network 19. The service request is received by the hub, repackaged and then broadcast to a receiving device that is connected to the network. The receiving device packages the service request and places the service request onto the network.

Figure 2:
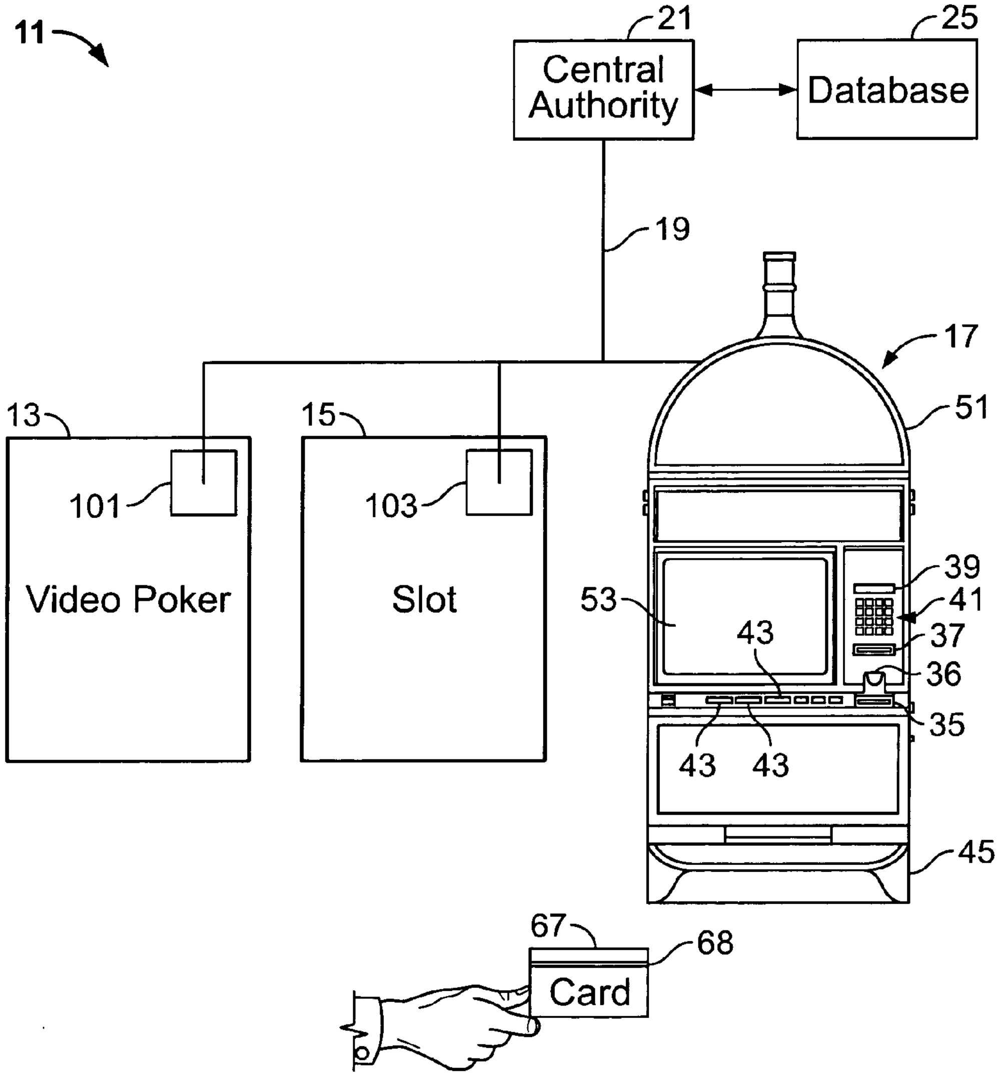
FIG. 2 illustrates an embodiment of a casino network system with an improved communications interface used in accordance with an embodiment of the present invention.

Referring to FIG. 2, another embodiment of a gaming system 11 includes a plurality of gaming machines 13, 15 and 17 interconnected over a network 19 to a server or central authority 21. Where a large number of gaming machines are connected to central authority 21, network 19 may include subnetworks using RS485 serial communications standard, for example, and data collection units (not shown). Network 19 also may be configured as an Ethernet network employing TCP/IP protocol, or may comprise a digital subscriber line (DSL) network, a fiber optic network, an RF network, etc.

Data is transmitted over network 19 between the gaming machines and central authority 21 which may be formed of one or more computers. Each gaming machine includes a smart communications interface (SCI) 101, 103, 105 for control of communications over network 19. Interface 101, 103, 105 is a microprocessor-based device. Central authority 21 stores game output data (received from the gaming machines) and may store game input data (to be sent to the gaming machines) in a central database 25.

More than the three gaming machines 13, 15 and 17 may be connected to network 19 of FIG. 2. For example, gaming machines 13, 15 and 17 may be slot electronic gaming machines and/or video poker electronic gaming machines. Other types of gaming equipment and gaming machines may be connected to network 19 of FIG. 2, including table games.

Gaming machine 17 is shown in more detail in FIG. 2 and includes a housing 51 that supports a number of components including a main display 53 that is positioned on the outer front face of the machine for direct presentation of a display to the player. An input area 35 receives a wager from the player in the form of currency bills or bar-coded vouchers. A card receiving slot 37 is positioned to receive a player card for use to identify the particular player at the gaming machine, as described hereinafter. A secondary display 39 also may be included, for the display of supplemental non-game information to the player, typically, in the form of instructions, points balances, or other information. As understood, all or part of supplemental display 39 may take the form of a display window located on primary display 53 or a secondary window on display 53. A keypad 41 is provided to allow the player to input data to the SCI of the gaming machine, particularly in response to instructions or questions on supplemental display 39. In addition, a plurality of decision making buttons 43 (and optionally a handle, not shown) are used by the player to play the game of machine 17. A payout tray 45 provides an area for redemption of awards based on play of the game, and a printer (not shown) may be used to print tickets or other redemption documents.

Display 53 displays the primary game features for play of a game. For example, the display may generate a conventional slot game in which a plurality of symbols are moved within their respective column, as if rotated, at the appropriate time in response to the user activation of the gaming machine.

Figure 3:
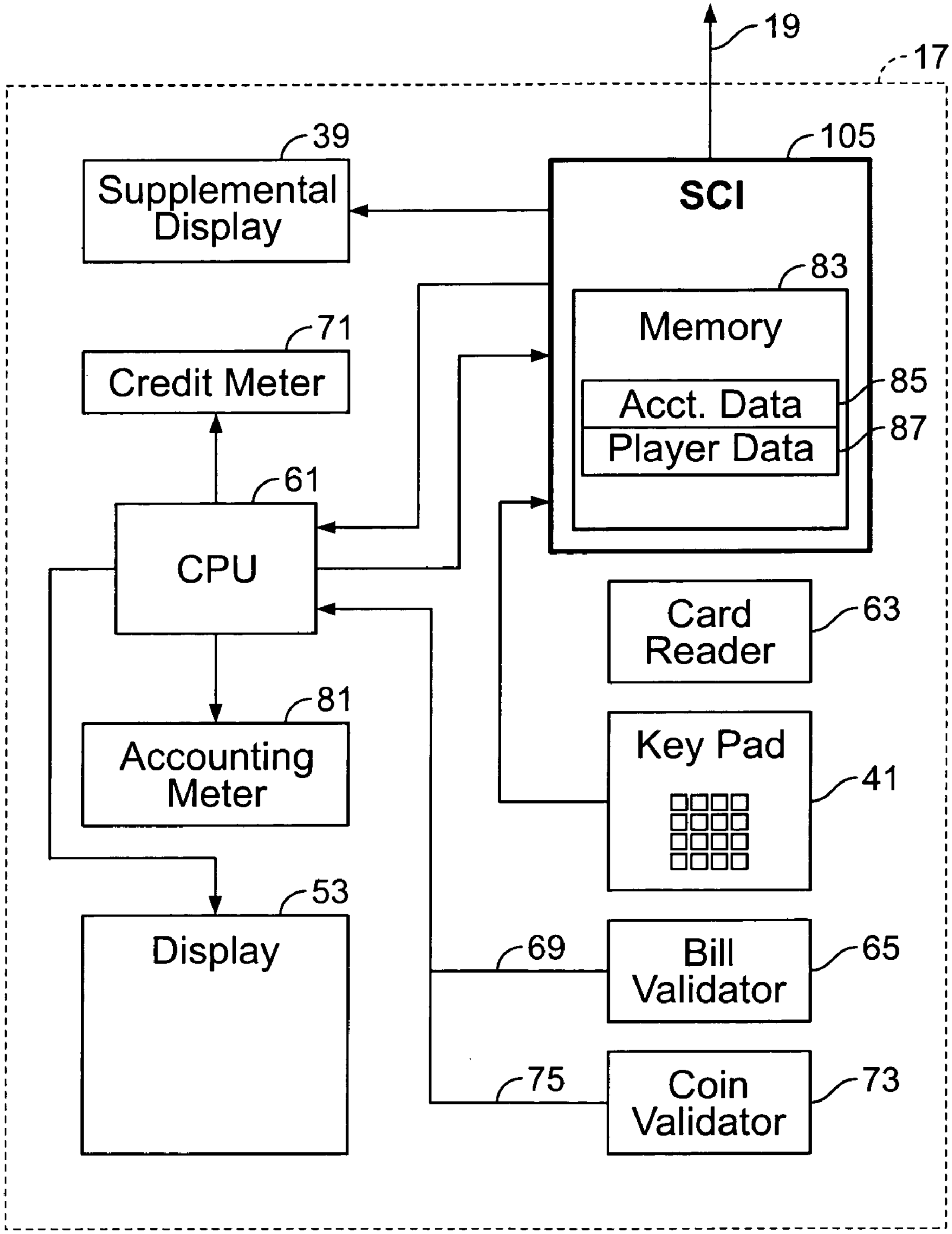
FIG. 3 depicts a gaming machine used in accordance with an embodiment of the present invention.

Referring now to FIG. 3, gaming machine 17 includes a game control CPU 61 which is responsible for carrying out the main functions of the gaming machine. CPU 61 executes each game as the player interacts with the gaming machine, including visually and/or audibly interacting with the player, as well as generating game outcomes. In addition, CPU 61 processes network information by receiving from, and sending data to, smart communications interface (SCI) 105. CPU 61 includes a microprocessor and associated memory (not shown particularly). Depending upon the type of gaming machine, CPU 61 may directly carry out some or all of the functions that SCI 101 may carry out.

Gaming machine 17 includes a number of peripheral devices including, for example, a card reader 63 and key pad 41. Card reader 63 and key pad 41 are used to identify the player at the gaming machine 17. The casino issues a player a player card 67 (FIG. 2) through an application process. Player card 67 typically includes a magnetic stripe 68 that is encoded with data to identify the player. In some cases, a personal identification number (PIN) is given to the player for security, and may allow access to certain features of the gaming machine. Card 67 is readable by a card reader 63 found in each of the gaming machines 13, 15, 17. Other types of cards may be utilized including optical cards, smart cards, etc.

In addition, a unique number is encoded onto a magnetic stripe 68 carried by the card. This unique number corresponds to a player account file which is maintained by central authority 21 in database 25. The account file may include information such as the player's name, address, amount of credit available, amount of promotional credits, amount of loyalty points, etc.

The player inserts his or her player card 67 into card receiving slot 37 (FIG. 2) for reading by card reader 63 (FIG. 3). SCI 105 detects the card insertion and receives the identification information contained on card 67. For example, the player's name, address and player tracking account number may be encoded on the magnetic stripe. The information contained on card 67 may be a reference number to retrieve player data from database 25.

SCI 105 provides display signals to display 39 in order to, for example, display the player's name, progressive amount (s), game information, supplemental information, and/or other message. Select messages may be displayed, for example, requesting the player to optionally enter his or her personal identification number (PIN) using keypad 41. Where the PIN is optionally entered by the player, SCI 101 communicates with the central authority in order that the PIN, for example, may be used to validate the player's identity. In other cases, the PIN may be used to access some features of the gaming machine 17 or system 11. Either the central authority or the SCI performs validation.

SCI 105 gains access to the player's account at the central authority. The player's account typically includes the number of player points (loyalty points) previously accumulated by the player, as well as additional statistics. In order for the gaming activity at a particular machine to be credited to the player's player account, the player or player account is identified at the gaming machine. Identification is typically accomplished by the player inserting his or her player card.

A PIN alone without a player card may be used to provide player identity to the gaming machine; and a card alone without a PIN may be used to provide player identity to the gaming machine. Alternatively, any of several biometric devices may be used to identify the player, including devices to check fingerprints, scan facial appearance, provide eye scans, etc. Such biometric input data may be used alone or in combination with player cards or PINs.

During game play, CPU 61 tracks gaming activity and provides gaming activity information to SCI 105. Such information may include an amount of money a player has wagered on each game, a number of games played, a time each game was initiated and a particular identification of a gaming machine, etc. For example, a system may track money wagered, money won and the time period tracked. Tracked information may be obtained by the SCI polling the CPU. The game activity information is sent to the central authority by the SCI. The central authority utilizes the game activity information to perform accounting functions and additionally generates player points which are added to the points in the player's account. Awards are provided by the casino in accordance with points accumulated by the player.

Any pre-stored data in the player's account may be downloaded to SCI 105 which in turn provides corresponding signal data to CPU 61. Where gaming machine 17 allows for player selection of the particular game played, players may pre-store their game preference in central database 25 (FIG. 2). Preference data may be downloaded to gaming machine 17 after player identification at the gaming machine.

The communication between SCI 105, central authority 21 and CPU 61 may take on different forms and protocols, as for example, serial, parallel, Ethernet, etc. In one embodiment, the SCI may be connected to the CPU 61 through a serial connection and communicates in accordance with a particular communication protocol or protocols depending upon the manufacturer of the particular gaming machine.

After a particular player has been identified as a valid player, other messages are presented on display 39. For example, the balance amount of points or credit remaining in the player's account may appear on the display. The player may use key pad 41 to download credits to the gaming machine, as described in U.S. Pat. No. 6,511,377.

Card reader 63 is housed in gaming machine 17, and positioned relative to card slot 37 to receive player card 67. Card 67 is inserted into reader 63 and information read from card stripe 68 is transferred to SCI 101 and stored in a memory 83 located in SCI 101.

A bill validator 65 is housed in gaming machine 17 and positioned relative to wager area 35 to receive currency bills inserted into validator 65 by a player. Bill validator 65, which may receive several bill denominations, detects the denomination of an inserted bill and generates a signal 69 to CPU 61. Bill validator 65 may also receive encoded vouchers or tickets and responsively generate a proper signal 69 relating to ticket insertion.

CPU 61, for example, responds to signal 69 by increasing the value on a game credit meter 71. Depending on the type of gaming machine, a value of credit meter 71 may be displayed on display 53. Credit meter 71 provides a visual indication to a player of a number of game credits available for play. In an embodiment, signal 69 may be sent to SCI 101, which in turn communicates with CPU 61 so as to change credit meter 71. Communication with the CPU through the SCI to change the credit meter may occur when a bill validator is retrofitted into a gaming machine that was originally manufactured without a bill validator. CPU 61 increases the credit meter after a ticket signal is received and value is determined.

A coin validator 73 is housed in gaming machine 17, and positioned relative to a coin slot 36 (FIG. 2) to receive coins which are inserted by a player into coin validator 73. Coin validator 73 generates a coin signal 75 to CPU 61. CPU 61, for example, responds by increasing the value of credit meter 71.

In accordance with a configuration of gaming machine 17, the gaming machine begins a game (for example, the reels spin) automatically after the credits appear on the credit meter or the game is started after the player presses a button 43 or pulls a handle (not shown).

Then, the game ends and a particular result appears. The gaming machine pays out certain amount(s) depending upon the result in a conventional manner. The pay out may include applying an amount directly to the credit meter 71, or paying the amount in coins or tokens directly from the slot machine to the player at tray 45, or where the amount is above a threshold level, a hand pay is made of the amount to the player. The player may cash-out credits by activating a cash-out button 43 or upload credits to the player's account in database 25. A ticket printer (not shown) may be used to dispense bar coded vouchers on cash-out, as well.

If a player desires to discontinue play or move to a different machine, the player removes the player card. Thereafter, the player card may be inserted into the same or a different gaming machine for continuing play.

The player's account may be formed of multiple accounts, for example, a CASH account, a POINTS account, a PROMO account, etc. Credit may be placed in the player's PROMO account by the casino as a complimentary incentive. This may happen when a player first arrives at the casino at hotel check-in or other event. Alternatively, credit may be applied to the player's CASH account in accordance with the player making a deposit of money, either coins or tokens directly into the slot machine or at a cashier. Such credits (or value) may be downloaded to the gaming machine and placed on credit meter 71.

The player's gaming activity is tracked by system 11 once the player account is established, the player has been issued a player tracking card bearing a unique identification number and the account is in a file in database 25, for example. The player's transactions at the gaming machine are logged by SCI 105 and reported to central authority 21.

In some situations, multiple player cards may be issued for a single account; each card identifies the same account. Each card may carry the same identification number. For example, a husband and wife may share a single account. The first card inserted allows the player to retrieve any or all of the credit available in the player's account. The second card inserted allows the second player to retrieve any remaining credit that remains in the account. Where both cards are simultaneously used on separate gaming machines, all player transaction activity is collected and forwarded to the player's account.

Numerous types of reports may be generated based upon the transaction activity logged in the player's account. For example, the amount of money played by the customer, the amount of credit used from the player's account, the amount of complimentary incentive credit utilized by the player, the amount of points converted to play credits at the game, the machine upon which the transaction occurred, the time of the play, or other event, etc.

Referring again to FIG. 3, CPU 61 keeps a plurality of accounting meters 81 that log transaction and machine data. Meters may be formed of electronic memory managed by CPU 61 and/or hard meters. CPU 61 responds to various gaming machine events and updates meters 81 accordingly. Meters 81 may be non-reset, accumulative meters; however, some meters 81 may be reset meters and statistics are available since the last reset of the meters. Basic events in which CPU 61 adjusts meters 81 may include: (1) money input by the player; (2) wagers placed by the player; (3) game wins from play of the game; and (4) cash out of credits by the player.

Only the particular meter(s) 81 to which an event pertains are adjusted upon the occurrence of the event. Data identifying the occurrence of events may be recorded also, including the time of the event and the particular type of event.

For example, meters 81 may include various drop meters to track money flow. A drop meter may be provided for each of the different forms of monetary value accepted by the gaming machine. For example, a coin drop meter may represent the total value of coins that fall to a "drop bucket" within the gaming machine housing for later collection by the casino. Also, coins may instead be diverted to a hopper system for later payout to the player and such diverted coins may be metered separately. Also, a bill count drop meter may count all paper currency that has been inserted into the bill acceptor. As another example, promo count meters count promotional credits that are received by the gaming machine from bar coded coupons, downloaded credits, bonus point conversions, and the like. Outflow of cash to the player may also be tracked by meters, including printed vouchers that have been issued by the machine.

Meters 81 may also keep track of game activity and include a game play meter for tracking the total number of bets actually wagered and a game win meter for tracking the total number of wins. Meters 81 may also track progressive amount(s) for different progressive link(s) and/or level(s) within a link. Purchased credits that are not wagered, but cashed out, may be tracked as well. Credit meter 71 is a visual meter that reflects the total amount of credit available to the player at any time, and may be driven from another meter 81.

CPU 61 communicates data to SCI 105 including events and readings of the accounting meters 81. For example, SCI 105 may poll CPU 61 for data, and then record such data in a memory 83. The data may be further processed by SCI 105, and then the processed data is stored in memory 83. Particular data stored in memory 83 includes accounting data 85 as well as player data 87 that is used to award player points.

SCI 105 performs game accounting functions by updating accounting data 85 and player data 87. SCI 105 transmits data 85, 87 to central authority 21. In addition, accounting data 85 and player data 87 may be initialized by central authority 21.

Tracking of data at the gaming machines occurs for carded and non-carded players. A non-carded player is a player who does not insert a player card during play. SCI 105 may retrieve data from CPU 61 including data stored by CPU 61 in meters 81. SCI 105 may also keep data that SCI 105 has obtained from sources other than CPU 61, such as data obtained from card reader 63. SCI 105 may process the data and convert the data to a particular form prior to transmittal to central authority 21. For example, data regarding a number of coins played during a certain period of time may be calculated by SCI 105 based on coin-in meter data at a start of the period and coin-in meter data at an end of the period.

SCI 105 reports certain data to central authority 21 which is placed in database 25. However, SCI 105 reports particular data, i.e., player data 87, which is related to the game activity of the player. Central authority 21 uses player data 87 to calculate player points and store player points in a particular player account held in database 25. For example, central authority 21 may calculate a number of loyalty points based on coin-in data of the player, and thereafter store points data in a player account. Alternatively, SCI 105 may perform points calculation and transmit the points data for storage in the player account in database 25.

SCI 105 may report a variety of accounting data to central authority 21 at various times. SCI 105 reports player data 87 which SCI 105 has accumulated in connection with the occurrence of a gaming session. The data may be reported when a player removes his or her player card from card reader 63. Where a player has the ability to convert points stored in his or her account to credits at the gaming machine, the timing of points credited to the player account may become important. It may be desirable also to forward player data 87 at predetermined times, for example, every hour, where the player's gaming session occurs over a lengthy period of time. Certain embodiments of an SCI are described in further detail in U.S. patent application Ser. No. 10/938,103, entitled "Communications Interface for a Gaming Machine", by Xiaoqiang D. Gong, filed on Sep. 10, 2004, which is herein incorporated by reference.

Gaming machines, such as gaming machines 13, 15 and 17 may be implemented, for example, as slot machines, video poker machines, video roulette machines, and the like. Gaming machines 13, 15 and 17 may be located in a local gaming environment, such as a casino, and/or a multi-site gaming environment, such as a plurality of networked casinos. Gaming machines 13, 15 and 17 may be used to play a first game and/or a second game employing one or more progressive jackpots as a reward. In an embodiment, a progressive jackpot used as a reward for a second game may be automatically determined by a gaming machine, progressive controller, and/or other server. A progressive jackpot may also or alternatively be selected by a player and/or determined by an outcome of the second game.

A gaming environment may include a progressive server capable of storing input data for gaming machines and output data from gaming machines in a central database. In an embodiment, a central processing unit (CPU) operates through a network interface and communication lines to enable communication with local data processing units. Local data processing units may be used to divide gaming machines into groups. Using a group-based architecture, transaction data from each group of games may be temporarily stored in the data processing units. The units may be structured so that the processing units include sufficient capacity and speed to accommodate data generated by the games. Therefore, system performance may be improved and data integrity may be preserved in the event of a network or progressive server error.

Processing units may also be designed to store data from database 25 that may be needed by gaming machines 13, 15, and 17. Such data will be readily available for use by the games even if networks are disabled or if the progressive server is disabled temporarily. As a result of these features, a gaming facility may remain operational even if some of its networks or the progressive server malfunctions.

A data processing unit may be implemented as a personal computer employing a central processing unit (CPU) that executes a poller algorithm, which polls gaming machines 13, 15 and 17 to obtain jackpot data over subnetworks a through data port unit (DPU), a message/transaction buffering device. In an embodiment, a CPU routes and buffers data, and communicates through a poller with gaming machines 13, 15 and 17. The poller transfers data between gaming machines 13, 15 and 17 and a local database. In an embodiment, gaming machines 13, 15 and 17 use SCIs 101, 103, 105 to "push" or transmit data to a local or central database without a poller. In another embodiment, gaming machines 13, 15, and/or 17 may communicate with a database or processor without use of SCIs 101, 103, 105.

Jackpot output data stored in the local database is transmitted at regular time intervals to a progressive server through a network interface and line and is stored in central database 25. Alternatively, jackpot output data may be transmitted and stored in central database 25 without use of a local database. Some of the input data in central database 25 also is transmitted to a local database and is stored in the local database. On occasion, gaming machines 13, 15 and 17 transmit input data, such as progressive jackpot data, to be stored in a local database, and the input data is sent to the gaming machines 13, 15 and 17 under control of the CPU.

The game jackpot data stored in a local database may be transmitted periodically to a progressive server and may be stored in central database 25. Some or all of the input data in central database 25 also may be transmitted to a local database. On occasion, gaming machines 13, 15 and 17 may transmit input data, such as progressive jackpot data, for storage in a local database, and the input data is sent to the gaming machines under control of the CPU.

In an embodiment, different games may store progressive jackpot data relating to different games. For example, gaming machines 13, 15 and 17 may store progressive jackpot data for a first progressive game, and gaming machines 13, 15 and 17 may store progressive jackpot data for a second progressive game. Jackpot meters that generate and store progressive jackpot data for the first progressive game are indicated as meters bearing the legend "JACKPOT 1", for example. Jackpot meters that generate and store progressive jackpot data for the second progressive game are indicated as meters bearing the legend "JACKPOT 2", for example.

In an embodiment, a game controller controls operation of a gaming machine. The game controller may include a microprocessor, memory, game software, and support circuitry to implement a slot machine or other type of game, for example. A gaming machine display presents to a player a representation of a pending credit in the gaming machine 13, 15 and 17 (e.g., $455.50). The display also may display information relating to the second progressive game, such as the value of the progressive amount and the name of the most recent winner of the progressive jackpot for the second game. During play, the game controller tracks the pending credit according to the rules of the game and the interaction with the player (including the deposit of additional funds via a coin comparator or bill validator).

In an embodiment, central database 25 stores a real time (RT) database that includes tables of data, for example "RT-JACKPOT 1" and "RT-JACKPOT 3", from which the amount of the progressive jackpot for the first game is calculated, and includes tables of data, for example "RT-JACKPOT 2" and "RT-JACKPOT 4", from which the amount of the progressive jackpot for the second game is calculated. The RT database also includes a table of data, for example "RT-PROGRESSIVE 1", relating to the first game, such as the current progressive amount for the first game and the name of the most recent winner of the progressive jackpot for the first game, and includes a table of data, for example "RT-PROGRESSIVE 2", relating to the second game, such as the current progressive amount for the second game and the name of the most recent winner of the progressive jackpot for the second game.

In operation, for example, at a gaming facility, meters in gaming machines 13, 15 and 17 generate jackpot data used in part to calculate the progressive jackpot for the first progressive game played on machines 13, 15 and 17. Also at the gaming facility, meters in gaming machines 13, 15 and 17 generate jackpot data used in part to calculate the progressive jackpot for the second progressive game played on machines 13, 15 and 17.

At the gaming facility, for example, meters in gaming machines 13, 15 and 17 generate jackpot data used in part to calculate the progressive jackpot for the first progressive game played on machines 13, 15 and 17. Also at the gaming facility, meters in gaming machines 13, 15 and 17 generate jackpot data used in part to calculate the progressive jackpot for the second progressive game played on machines 13, 15 and 17. At regular time intervals, data from tables, for example "L-JACKPOT 3" and "L-JACKPOT 4", is transmitted to corresponding database 25 tables "RT-JACKPOT 3" and "RT-JACKPOT 4", respectively. Data from the tables may be combined if desired. For example, the data of tables "RT-JACKPOT 1" and "RT-JACKPOT 3" may be combined. Likewise, the data of tables "RT-JACKPOT 2" and "RT-JACKPOT 4" may be combined, for example.

Server 21 calculates data relating to the first progressive game played on machines 13, 15 and 17 and stores the data in a table "RT-PROGRESSIVE 1" based at least in part on the data in tables "RT-JACKPOT 1", "RT-JACKPOT 3" and "RT-PLAYER", for example. Server 21 also calculates and stores data relating to the second progressive game played on machines 13, 15 and 17 and stores the data in a table "RT-PROGRESSIVE 2" based at least in part on the data in tables "RT-JACKPOT 2", "RT-JACKPOT 4" and "RT-PLAYER", for example. For example, table "RT-PROGRESSIVE 1" may store the current progressive amount for the first game and the identity of the most recent winner of the progressive jackpot for the first game. The winner of the progressive jackpot for the first game may be identified in part by data from table "RT-PLAYER". Table "RT-PROGRESSIVE 2" may store the current progressive amount for the second game and the identity of the most recent winner of the progressive jackpot for the second game. The winner of the progressive jackpot for the second game may be identified in part by data from table "RT-PLAYER".

Some or all of the data in tables "RT-PROGRESSIVE 1" and "RT-PROGRESSIVE 2" may be transmitted to a gaming facility, for example. For example, the data is stored in tables "L-PROGRESSIVE 1" and "L-PROGRESSIVE 2", respectively. Data from progressive table(s) may also be transmitted to gaming machines 13, 15 and 17. In response to the data, gaming machines 13, 15 and 17 generate a display including, for example, information about the first game, such as a current progressive amount for the first game or the identity of the most recent winner of the progressive jackpot for the first game.

In an embodiment, one or more progressive games or amounts may be facilitated using one or more progressive links and/or one more levels within one or more links. A progressive link includes one or more gaming machines contributing to one or more progressive amounts eligible for a win on any of the linked gaming machine(s). A progressive link may include one or more levels or accumulating amounts. The progressive links may be running at one or more gaming environments, such as one or more casinos. One or more banks of gaming machines in one or more gaming environments may be shut down for a variety of reasons. For example, machine(s) may be shut down permanently or temporarily inactivated due to time of day, maintenance, time-limited bonusing, retiring a game or machine, reconfiguring a game or machine, etc.

If the machine(s) being shut down are running one or more progressive links or levels, amounts accumulated in the progressive link(s)/level(s) above the progressive base amount(s) are to be dispersed to active progressive link(s). That is, if a progressive link has been played and has incremented from a base amount and the link is removed, the amount incremented in the progressive amount above the base amount is to be dispersed or applied to one or more currently active progressive links.

In an embodiment, each progressive link includes one or more levels. When removing a progressive link, a progressive link/level or link/level combination is removed. A progressive link may include up to twenty different levels, for example. For example, level zero may be a royal flush; level one may be a straight flush; level two may be a four of a kind, level three may be a full house, etc. A progressive link may be removed with all of its associated levels, or certain levels of a progressive link may be removed. A pending dispersal record is created for each progressive link/level combination that is removed. In an embodiment, a gaming environment including one or more sites may include one or more progressive links with one or more levels.

Figure 4:
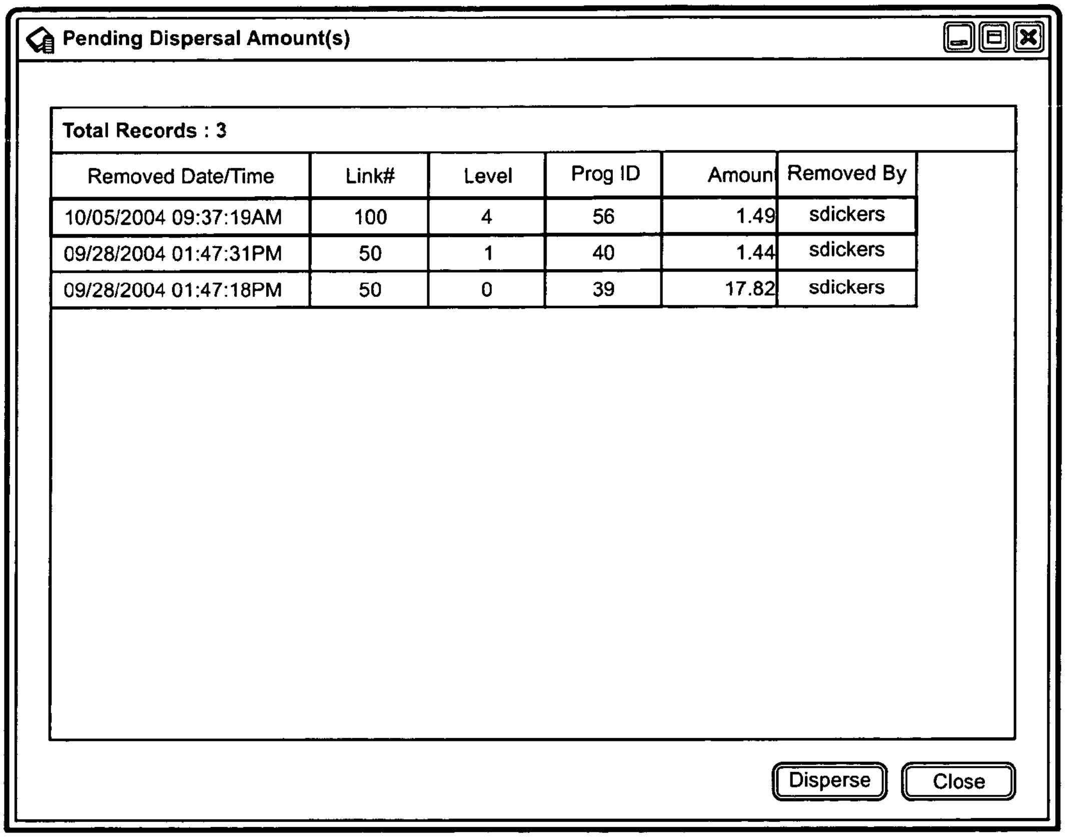
FIG. 4 shows an example of a pending dispersal screen for a progressive manager used in accordance with an embodiment of the present invention.
Figure 5:
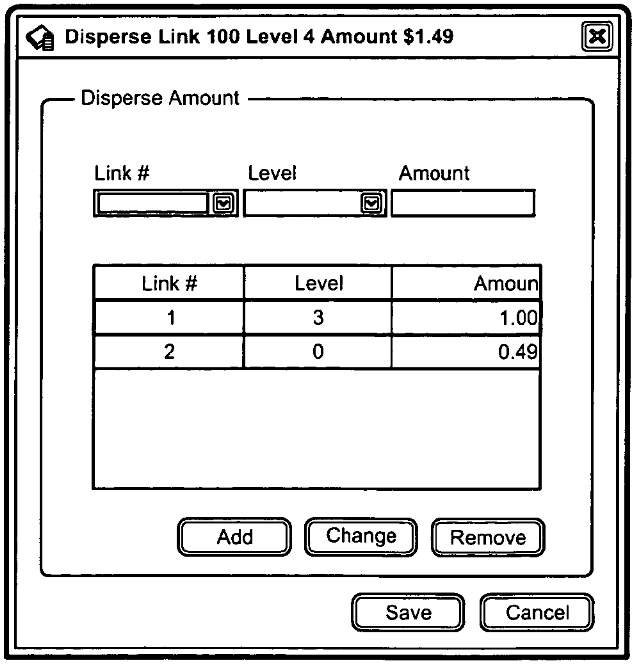
FIG. 5 shows an example of a link dispersal screen for a progressive manager used in accordance with an embodiment of the present invention.

In an embodiment, a progressive manager facilitates progressive link or level removal and progressive amount dispersal. The progressive manager tracks one or more progressive amounts from one or more gaming facilities. As shown in FIG. 4, for example, the progressive manager may automatically populate a display in which authorized users may view amounts to be dispersed and perform a dispersal. A report may also be generated to show information regarding pending dispersal(s), for example. Once a progressive link with an excess progressive amount is removed and is marked as a "pending dispersal", the progressive manager may automatically alert one or more authorized users of the pending dispersal. The user(s) may then perform the pending dispersal (s), as shown in FIG. 5, for example. Thus, the progressive manager alerts user(s) so that the dispersal(s) are not forgotten.

Once a user is viewing the pending dispersal screen (e.g., FIG. 4), the user may choose to disperse or apply an amount over a single progressive link or level within a link or multiple progressive links or levels within a link, for example. When a user selects appropriate progressive link(s) to disperse, the progressive manager automatically adjusts the selected progressive link(s) (e.g., FIG. 5). Alternatively, a scheduled dispersal may be configured in advance so that when a progressive link is removed, the amount over the base amount is automatically dispersed to a preset location (progressive link (s) and/or level(s), for example). In an embodiment, one or more amounts may be dispersed to progressive link(s)/level (s) over time or at an interval rather than a particular scheduled time, for example.

For example, a progressive link #1 has an amount of $1295.43. The base amount (or reset amount) for progressive link #1 is $1000.00. Progressive link #1 is removed. The amount over the base amount ($295.43) is to be dispersed to other currently active progressive link(s). A user may access a "pending dispersals" screen in a progressive manager application, such as the ProTURBO™ Progressive Manager application, to view the pending dispersal of $295.43 from progressive link #1. The user may then choose to disperse the $295.43 to other currently active progressive link(s). For example, the user may apply $100.00 to progressive link #2, level 0, then disperse $120.00 to progressive link #3, level 1, and then disperse $75.43 to progressive link #4, level 5. The progressive manager then automatically applies the amount (s) to the progressive link(s) and level(s) as specified and records audit trail entries for future auditing and running reports.

As another example, a user may determine that progressive link #3 is being removed in two weeks. The user accesses a dispersal scheduler inside a progressive manager, for example, and selects a date and time to remove progressive link #3. The user uses the dispersal scheduler to also specify the progressive link(s) and/or level(s) to which progressive link amount over a base amount is to be dispersed. When the selected data and time arrives, the progressive manager automatically performs the scheduled dispersal without any user action. Alternatively, the user may designate an interval or time period over which to disperse the progressive link amount.

In an embodiment, dispersals may be scheduled to automatically occur based on one or more criterion that may be configured by a user. For example, a dispersal amount may be applied to a single link and/or link level. Percentages of a dispersal amount may be applied to multiple links and/or levels within links. A dispersal amount may be applied evenly to specific links/levels. A dispersal amount may be applied evenly to links/levels having a selected link denomination. A dispersal amount may be applied evenly to the worst performing link(s)/level(s). A dispersal amount may be applied evenly to link(s)/level(s) where a jackpot has most recently occurred or where a jackpot has least recently occurred. A dispersal amount may be determined and/or a link/level selected based on how much a certain progressive link has been played. For example, the progressive manager may track which progressive links are most frequently played to disperse amount(s) to frequently played link(s) or to disperse the amount(s) to other progressive link(s) not as frequently played. Other criteria may be configured by a user and/or system, for example. Thus, a user or automated system may select from a variety of options when setting up an automatic dispersal.

The progressive manager may run on one or more workstations, gaming machines, and/or other computing systems, for example. One or more users or systems may utilize the progressive manager to execute one or more functions relating to progressive jackpot/link management and/or dispersal, for example. Dispersal functions may be a standalone application/system and/or may be integrated with link removal and/or link management, functionality, for example.

In an embodiment, a progressive link may include one or more "hidden" amounts per link and/or level within a link. Hidden amounts may be used to increase a progressive amount from a base amount after a progressive jackpot award. For example, a bank of video slot machines is running a progressive link with one level. For each wager, 0.5% of the wager is added to the progressive link amount, and 0.1% of the wager is added to the hidden amount. A player may not be aware of the hidden amount. When a progressive jackpot is won, the progressive amount is reset to a base amount, and the hidden amount is added to the base amount. Use of the hidden amount may increase player enthusiasm and reward if successive progressive jackpots are awarded in close temporal proximity, for example.

Figure 6:
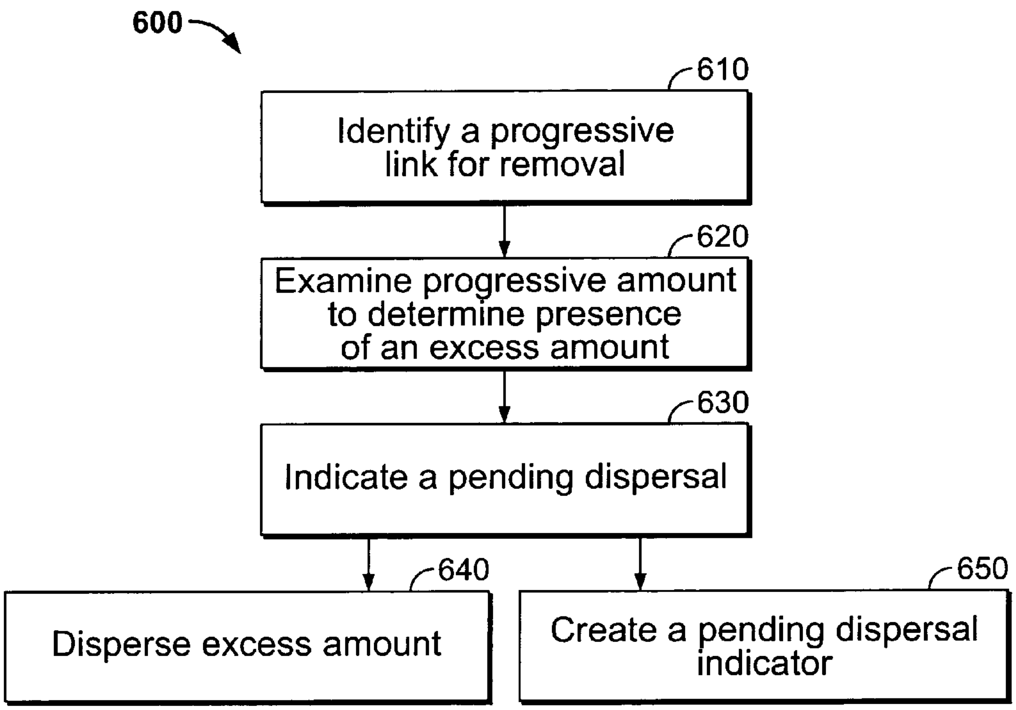
FIG. 6 illustrates a flow diagram for a method for progressive link removal and dispersal in accordance with an embodiment of the present invention.

FIG. 6 illustrates a flow diagram for a method 600 for progressive link removal and dispersal in accordance with an embodiment of the present invention. First, at step 610, a progressive link is identified for removal. For example, a progressive link, such as a casino Hyperlink®, may be removed after a promotional game has ended. Then, at step 620, a progressive amount for the progressive link is examined to determine whether any amount has been accumulated over a base amount for the progressive link.

At step 630, if an excess amount exists, a pending dispersal is indicated. For example, a pending dispersal record is created indicating a removed link/level, amount, and target link/level. Next, at step 640, if an automatic dispersal has been scheduled, the excess amount is dispersed as scheduled. For example, the excess amount may be dispersed at a particular time and/or at a certain time interval. At step 650, if no automatic dispersal has been scheduled, a pending dispersal indicator, such as a pending dispersal record, is created and stored to indicate the excess amount for viewing by a user.

Figure 7:
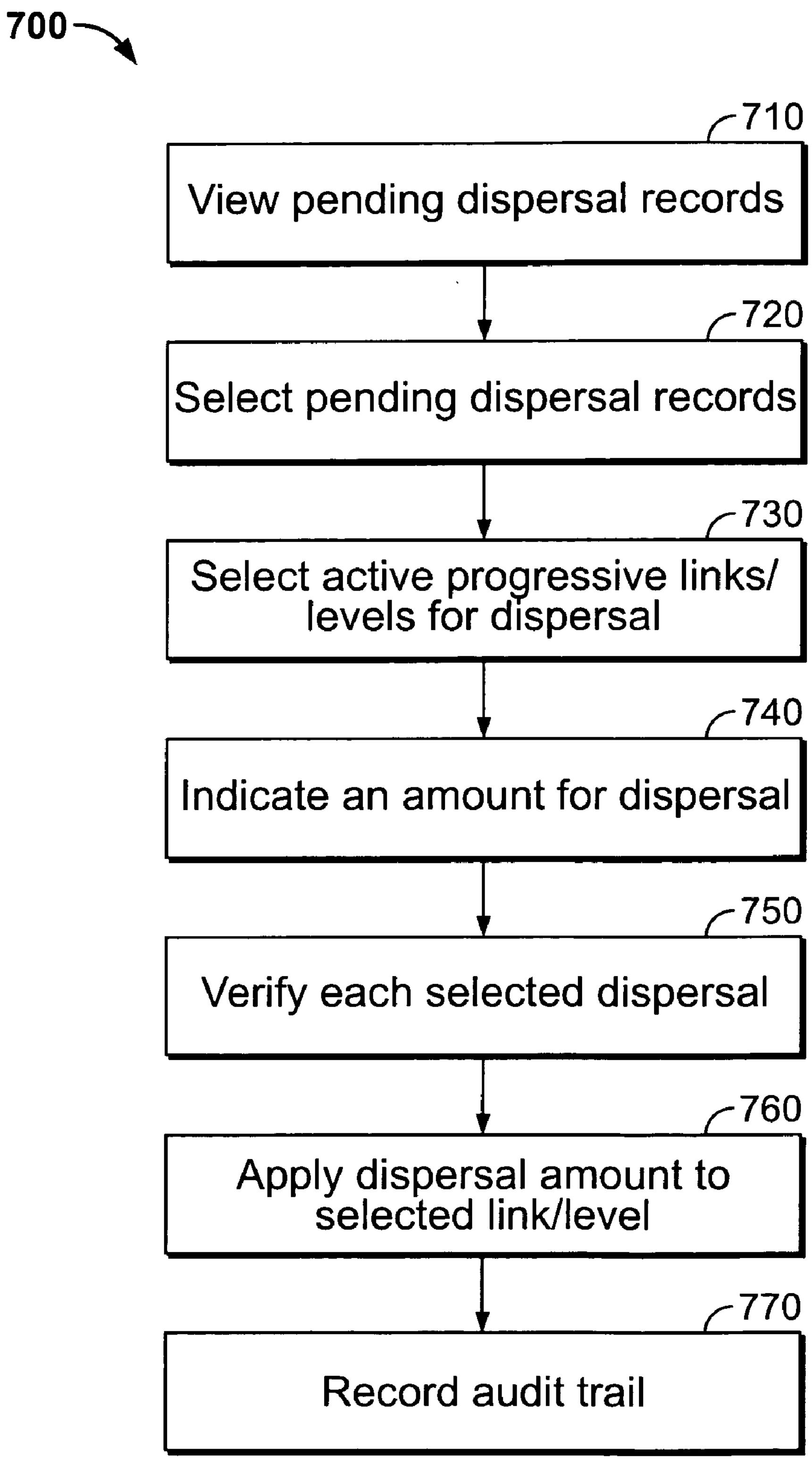
FIG. 7 illustrates a flow diagram for a method for progressive link dispersal management in accordance with an embodiment of the present invention.

FIG. 7 illustrates a flow diagram for a method 700 for progressive link dispersal management in accordance with an embodiment of the present invention. First, at step 710, one or more pending dispersal records are viewed. For example, pending dispersal records may be viewed via a graphical user interface or browser on a workstation, for example. Then, at step 720, one or more of the pending dispersal records are selected. For example, a user may "click on" one or more pending dispersal records with a mousing device or otherwise select one or more pending dispersal records. At step 730, one or more currently active progressive link(s)/level(s) are selected to which amount(s) are to be dispersed. For example, one or more activate links/levels may be highlighted using a mousing device or otherwise selected by a user. Next, at step 740, an amount of money to disperse to each link/level is indicated. For example, amount(s) may be selected or entered by a user via a user interface.

Then, at step 750, each selected dispersal may be verified to help ensure that the dispersal may be completed without exceeding one or more criteria. For example, each selected dispersal may be verified to help ensure that the dispersal would not result in an amount exceeding a maximum amount value for each link/level, if a maximum amount value is set. At step 760, each disperse amount is applied to each selected link/level. Current progressive amounts for each link/level are updated to reflect the change. Then, at step 770, the changes are recorded for auditing, reporting, and/or accounting purposes, for example. For example, an audit trail is created for later review and verification.

Figure 8:
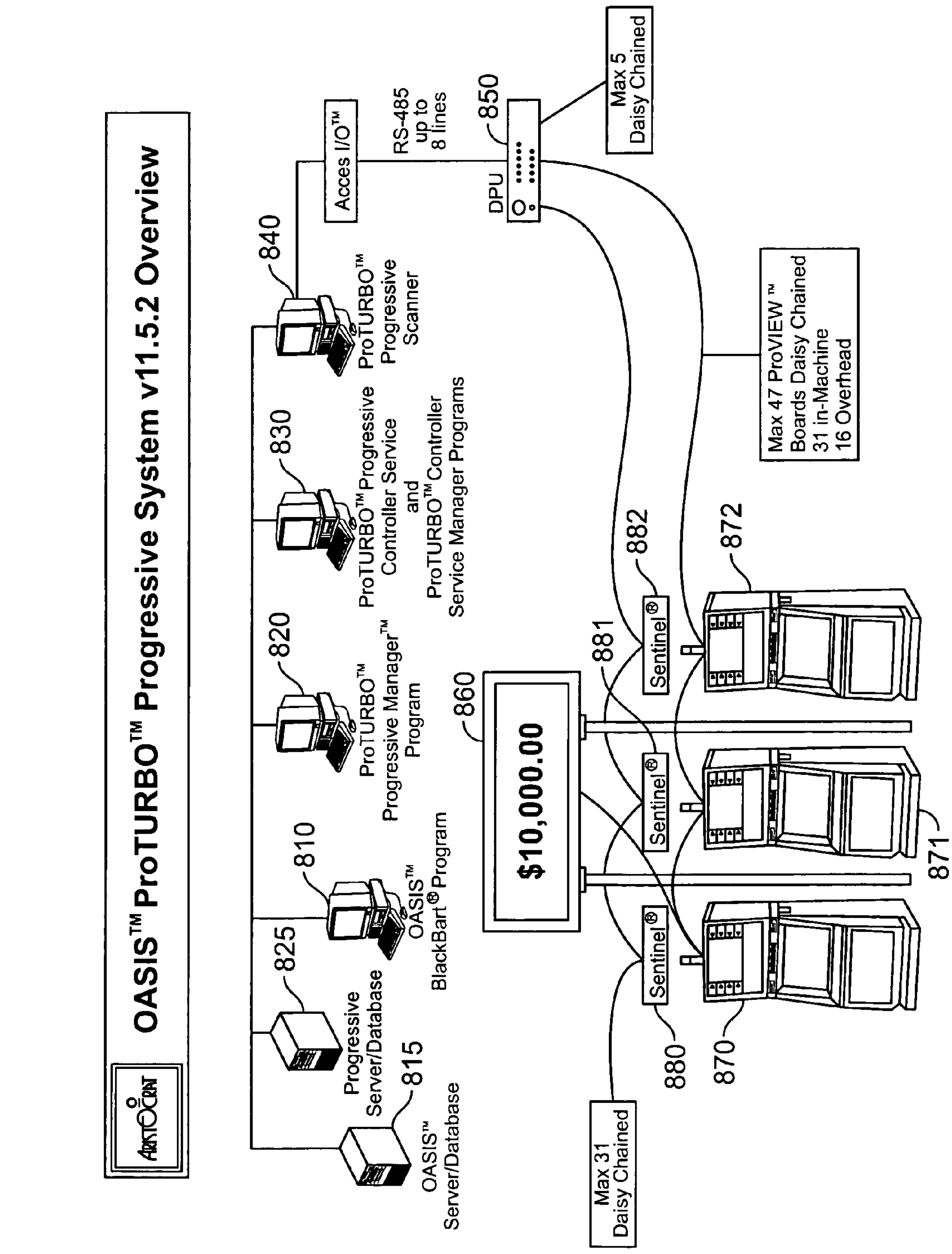
FIG. 8 illustrates a progressive system with a progressive manager used in accordance with an embodiment of the present invention.

In an embodiment, progressive link dispersal may be integrated with a progressive management system. An example of a progressive system 800 with a progressive manager used in accordance with an embodiment of the present invention is illustrated in FIG. 8. The progressive system 800 includes a casino manager 810, a progressive manager 820, a progressive controller 830, a progressive scanner 840, a data port unit (DPU) 850, a progressive display 860, and a plurality of gaming machines 870, 871, 872 with interface units 880, 881, 882. The system 800 may also include a casino management server/database 815 and/or a progressive server/database 825. The components of the system 800 may be implemented in software and/or in hardware and may be separated and/or integrated in a variety of forms. The progressive system 800 combines player tracking and slot accounting features with features for progressive games and display of progressive jackpots on screens and meters.

The interface units 880-882, such as Sentinel®-based communications interface boards, facilitate communication and monitoring of gaming machines 870-872 by the casino manager 810 and/or progressive manager 820. For example, the interface unit 880 monitors signals from the gaming machine 870. Information from the gaming machines 870-872 is provided to the DPU 850 via the interface units 880-882. A single DPU 850 may be dedicated to a single interface unit 880-882 or may interact with a plurality of interface units 880-882. The DPU 850 may be used to poll the interface units 880-882 for data from gaming machines 870-872. Alternatively, the interface units 880-882 initiate communication with the DPU 850. Gaming machine 870-872 information may include coin in, coin out, coin drop, bill transactions, jackpot signals, and/or jackpot amounts (e.g., progressive, bonus, and/or other winning amount), for example. In an embodiment, one or more of the gaming machines 870-872 may communicate with the system 800 without use of the interface units 880-882. For example, the gaming machines 870-872 may communicate with the DPU 850, the progressive controller 830, and/or the progressive scanner 840.

The progressive scanner 840 receives data, such as transaction data, meter data and/or status information, from the interface units 880-882. In an embodiment, the scanner 840 obtains data from the interface units 880-882 and/or from the gaming machines 870-872. In another embodiment, the scanner 840 polls the DPU 850 which polls the interface units 880-882 to obtain data. The progressive scanner 840 communicates with the progressive controller 830 to store data in the database 825. In an embodiment, the scanner 840 includes a user interface. The user interface may provide information regarding, for example, scanner 840 activity and control, real-time interface unit 880-882 information, real-time transaction information (e.g., the most recent 100 transactions), polling and other communication or message data, configuration information and control, and/or operator commands. The scanner 840 may be used to connect a plurality of interfaces 880-882 through zero or more DPUs 850. In an embodiment, the system 800 may include a plurality of scanners 840 for greater machine capacity, improved operational flexibility, data handling, and/or throughput, for example.

The progressive controller 830 may be used to perform database updates in the progressive system 800. Information inserted or updated in the progressive database 825 may be routed through the progressive controller 830. The progressive controller 830 may receive information requests from the scanner 840 and returns data from the database 815, 825. The progressive controller 830 stores transaction information in the database 815 and/or database 825. The progressive controller 830 may query the progressive database 825 for progressive amount information and transmit the data to the scanner 840. The progressive controller 830 may clear and/or configure progressive jackpot signals and/or other signals based on transaction data and/or other information, for example. The progressive controller 830 may read configuration and input/output access information for the system 800.

The progressive controller 830 may include a progressive controller service manager. The progressive controller service manager may be used to configure data paths and/or other parameters between servers, workstations, and/or databases in the system 800. The service manager may be used to provide debugging and/or status information, for example. The progressive controller service manager may include a user interface, such as a graphical user interface, allowing a user to view system status and other information, for example.

The progressive manager 820 allows authorized users to configure progressive links/levels, including adding and removing games and/or progressive links/levels, meters, and/or setting jackpot reset amounts and rate of progression, for example. Users and/or software may configure progressive system parameters using a user interface running on the progressive manager 820 and/or a workstation in communication with the progressive manager 820, for example. The progressive manager 820 monitors, in real-time, for example, progressive levels, payouts, and statistics for machines 870-872 contributing to progressive jackpots. Progressive links/levels may be adjusted, configured, and/or reset via the progressive manager 820. Reports, such as accounting, diagnostic and administrative reports, may also be generated using the progressive manager 820. The progressive manager 820 may generate progressive amount and/or other information for display via progressive display 860 and/or gaming machine 870-872 display, for example. The progressive manager 820 may access databases 815, 825 to aid in report generation, progressive configuration, and/or other system adjustment, for example.

Thus, the progressive manager 820, such as a Pro-TURBO™ progressive manager, allows centralized control of one or more progressives in a gaming environment. The progressive manager 820 may be used to monitor progressive activity and perform a variety of functions. For example, the manager 820 may allow assignment of user access rights to the progressive system 800. The manager 820 may allow a user to view current progressive amounts on all progressive links, for example. Additionally, the manager 820 may allow a user to view current and historical progressive transactions, for example. Progressive links may be cleared, reset, and/or adjusted via the progressive manager 820, for example. Furthermore, the progressive manager 820 may be used to assist in troubleshooting problems occurring in the DPU 850, interfaces 880-882, gaming machines 870-872, and/or other system components. In an embodiment, a progressive revenue audit may be performed via the progressive manager 820. Additional functions available via the progressive manager 820 may include set up and configuration of progressive link setting, such as jackpot levels, increment rates, and reset values, generation of a series of selectable reports, and viewing transactions and pending jackpot information, for example.

The casino manager 810 facilities player tracking, slot accounting, game configuration, and bonusing, for example, in the system 800. The casino manager 810, such as an OASIS™ casino management system, may also facilitate promotions, ticket generation, marketing, reporting, crediting, and communication between players, gaming employees, and the system 800, for example. The casino manager 810 may be used for game configuration and modification for gaming machines 870-872, for example. The casino manager 810 helps to provide centralized management of a gaming environment, such as one or more casinos.

Thus, certain embodiments provide an improved system and method for complying with regulations for dispersal of progressive jackpot amounts for removed progressive links. Certain embodiments provide for automatic or semi-automatic calculation and dispersal of progressive amounts in excess of a base jackpot amount from a removed progressive link and/or level to one or more active progressive links and/or levels.

Certain embodiments allow a gaming facility to remove progressive links and track amounts to be dispersed, including audit trail information. Certain embodiments allow a user or system to select one or more links and/or levels to disperse excess amounts from removed progressive links. Certain embodiments allow a user to select criteria governing such dispersal. Certain embodiments provide an ability to record information when a progressive link is removed and help to ensure that the money is actually dispersed as required by law. Certain embodiments allow reporting and accountability while helping to minimize mistakes resulting from manual recordation and dispersal of excess funds. Certain embodiments allow advance scheduling of progressive link removal and/or jackpot dispersal.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A progressive gaming system, said system comprising:

a plurality of progressive games offering respective progressive awards, a first of said plurality of progressive games having a progressive award which is started at a base amount;

a first progressive link including at least one gaming machine, providing said first progressive game, and being removable from the system;

a second progressive link including at least one gaming machine providing a second of said plurality of progressive games;

a third progressive link including at least one gaming machine providing a third of said plurality of progressive games;

a computer implemented progressive manager arranged to:

monitor said first progressive link for a predefined link removal event representative of the first progressive link being removed; and in response to the predefined link removal event being detected, (1) evaluate the second progressive link and the third progressive link to make a determination of how much the second progressive link and the third progressive link have been played; and (2) automatically disperse to at least one of said second and third progressive awards at least a portion of said first progressive award greater than said base amount based on the determination of how much the second progressive link and the third progressive link have been played; and a user interface allowing a user to view, adjust and approve progressive links and dispersals.

2. The system of claim 1, wherein said progressive manager calculates said portion of said first progressive amount greater than said base amount.

3. The system of claim 1, wherein said first and second progressive links are active in first and second gaming environments.

4. The system of claim 1, wherein said progressive manager schedules automatic dispersal of said portion of said first progressive amount to a selected progressive amount at a selected time.

5. The system of claim 1, wherein said progressive manager schedules automatic dispersal of said portion of said first progressive amount to a selected progressive amount over a period of time.

6. The system of claim 1, further comprising at least one meter to track said first and second progressive amounts.

7. The system of claim 1, wherein said progressive manager disperses said first progressive amount and an additional amount to said second progressive amount.

* * * * *